UNITED STATES PATENT OFFICE.

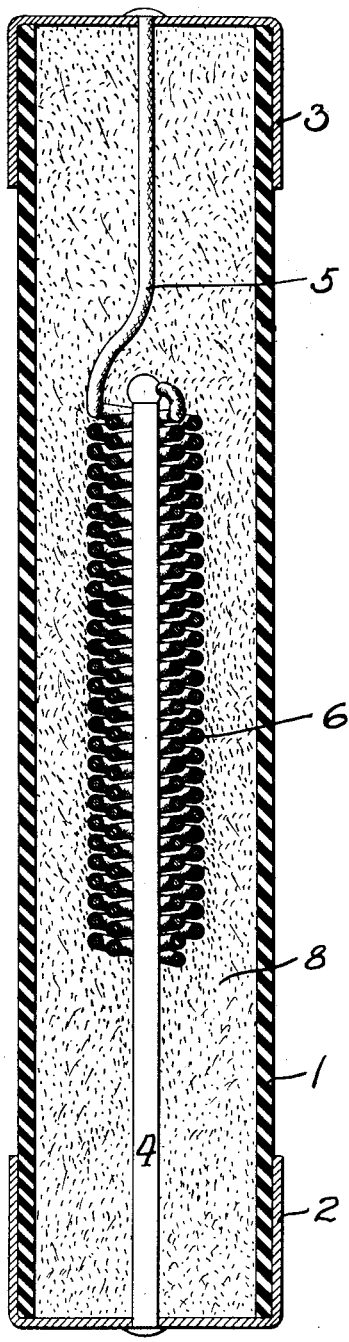

SYDNEY N. BARUCH, OF SAN FRANCISCO, CALIFORNIA, ASSIGNOR TO BARUCH ELECTRIC CONTROLLER CORPORATION, OF SAN FRANCISCO, CALIFORNIA, A CORPORATION OF CALIFORNIA.

ELECTRIC-CIRCUIT-PROTECTING FUSE.

1,214,879.   Specification of Letters Patent.   Patented Feb. 6, 1917.

Application filed August 25, 1915. Serial No. 47,331.

*To all whom it may concern:*

Be it known that I, SYDNEY N. BARUCH, citizen of the United States, residing at San Francisco, in the county of San Francisco, State of California, have invented a new and useful Electric-Circuit-Protecting Fuse, of which the following is a specification in such full and clear terms as will enable those skilled in the art to construct and use the same.

This invention relates to a fuse for protecting electric circuits, which has such a time element in its operation as to protect the circuits in which it is used from long continued overloads, and which will protect the circuits from excessive momentary overloads.

The object of my invention is to provide a protective device having a fusible element that is automatically changed in current carrying capacity by auxiliary thermal effect substantially in ratio with the thermal effect of the current traversing the windings of the electrical apparatus to be protected.

It is a well known fact that where induction motors are used, two sets of fuses are ordinarily necessary, known as the "starting" fuses and "running" fuses. The starting fuses have a carrying capacity of some three or four hundred per cent. above the normal amperage taken by the motor and on starting some types of motors, a double-throw switch is used, being thrown first on the "starting" side owing to the fact that the motor takes three to four hundred per cent. of its normal current, and then, when the motor attains its normal speed and the counter electromotive force reduces the amperage taken by the motor to normal, the switch is then thrown to the "running" side containing fuses for the protection of the motor against excess of overloads, etc. In practice it has been found that the switch is sometimes left on the "starting" side and protected only by the starting fuses, which have the normal continuous capacity of usually about four hundred per cent. above that of the motor. Under this condition, should one of the fuses "blow" or should the line become single-phased, provided the motor is on a poly-phase circuit, and if the motor is running with a partial load, it may take fully one hundred per cent. overload current, and while running on ordinary load it would burn out in say ten or fifteen minutes, but if the load is sufficiently great, it will be too much for the motor to carry on single phase, and consequently the motor will gradually slow down within a short period of time and the rotor will become what is known as "stalled" when the amperage taken by the motor increases in ratio to the slackening of the speed, until when the motor is actually stalled it takes from three to four hundred per cent. of its normal current. This would burn out a motor in from thirty seconds to two minutes, depending upon the size and type of the windings in the motor, without blowing the starting fuses. Therefore, it is desirable that a fuse should be available that will automatically compensate to reduce or increase its carrying capacity in ratio with the thermal effect of the current on the motor. For instance when the motor starts, it must allow a large starting current to flow and when the motor runs at speed, so that the counter electromotive force due to induction reduces the normal amperage, the carrying capacity of the fuse must be reduced accordingly, so that it will allow all the overloads that the motor will stand at all times without injuring the motor but must protect against anything in excess of this. This is not practical with ordinary fuses owing to the fact that their characteristics are predetermined or fixed, and their carrying capacity does not increase or decrease in proportion or ratio with the heating of the motor, and the effect of this is to decrease the full overload capacity of any motor, transformer or other apparatus to which the fuse is connected.

Owing to the fact that the carrying capacity of fuses is ordinarily fixed or predetermined, they have no overload capacity which would be allowable on electrical apparatus and in fact preferable since electrical apparatus may be overloaded for a short period of time without affecting it injuriously. This same overload will blow out the ordinary fuse which is used to protect it, thereby necessitating repeated replacement, whereas if it were possible to provide a fuse having a time element, it would allow for short and unharmful overloads within its range thereby saving annoyance and expense.

It has been proposed to wind a resistance wire wound about a fusible alloy or metal, so that on very small excess currents the fuse would be melted by the direct heating effect of the heat generated in the resistance wire. This was for the purpose of decreasing the natural time element caused by the thermal effect of amperage or current on the fuse wire. It has always been the object of those skilled in the art to reduce the time of overload or overload capacity of any fuse to a minimum, whereas the object of my invention is to lengthen the time element of the fuse to cover the corresponding differentiation between the abnormal starting currents taken by electrical apparatus and the normal running currents with the overloads of but short duration.

The manner in which I have overcome the difficulties above mentioned will be clearly understood from the following detailed description in connection with the accompanying drawing in which the figure is a longitudinal sectional view of a device embodying my invention.

The casing 1 is made of fiber board or other suitable insulating material and is provided with metal end caps 2, 3. The fusible element 4, is riveted or otherwise secured at one end to the cap 2 in electrical and heat-conducting connection therewith. To the opposite end of the fusible element is secured one end of a preheating element 6, which I have illustrated in the form of a coiled insulated conductor, surrounding said fusible element, the opposite end being riveted or otherwise secured to the cap 3. I have shown the coil 6 as consisting of two concentric spirals reversely wound in the manner ordinarily employed in constructing non-inductive coils.

The conductor of the coil 6, may have a carrying capacity equal to that of the windings of the motor, transformer or other apparatus in circuit therewith. The fusible element 4 is preferably of much larger rated carrying capacity. For instance, if a 15 ampere fuse is proper for the protection of a motor under running conditions, I may employ a fuse 4 of 40 ampere rated capacity. This will permit the initial flow of the very large motor starting current. As the motor attains speed, the counter electromotive force of the motor cuts down the current and this is further reduced by the increased resistance due to the heat generated in the motor windings. The coil 6, likewise becomes correspondingly heated by the passage of the motor current therethrough and this heat is transmitted to the fuse member 4, by radiation, convection and conduction. The amount of heat generated in the coil 6 is, of course, dependent upon the amperage of the current, the mass of metal in the coil and the rapidity with which the heat penetrates the filler 8, which is preferably of asbestos or other suitable heat and electric insulating material, and the heat being also radiated to a certain extent through the cover 1. The surrounding medium and cover thus restrain the dissipation of heat from the coil 6 and modifies its thermal effect upon the fusible element. Again it is obvious that the amount of heat so transmitted from the preheater 6 to the fuse member 4, will also depend upon the proximity of the coil to the fuse and the extent of the fuse 4 covered by or adjacent to the preheating coil 6. By changing or proportioning these several elements to suit the conditions of the work, I may regulate the time element in the operation of the device in any particular case and the amount of heat which is transmitted from the preheater 6 to the fuse member 4 and the rate of such heat transmission so as to regulate the heat characteristics of the device as described.

Referring again to the example last mentioned, I may in the manner described, proportion the parts so that the effect of the heat transmitted to said normally rated 40 ampere fusible member 4, from the preheater element 6, shall heat said member 4, to a temperature sufficient to increase its resistance and decrease its carrying capacity to that of a normally rated 15 ampere fuse. It will be observed therefore, that the change or modification in the current-carrying capacity of the fusible member is effected by the heat transmitted thereto by radiation, conduction and convection directly from the preheater 6, and that the change in the heat characteristics and the variation in the time element of the fuse 4, is due to the external action of said preheater which predetermines its condition in advance of any condition which eventually endangers the motor or other apparatus connected therewith, thus automatically varying the characteristics of the fuse in advance of the operation which it may be required to perform due to the action of the current passing therethrough. The insulating medium surrounding the conductor 6 of the preheater and the fusible element 4, retards the thermal action of the preheater thereon so that the transmitted heat can never fuse the element 4, or impair its integrity and its ability to perform its function of maintaining the electrical connection with the motor or other apparatus until the critical current value is reached. By critical current value, I mean of course, that current amperage beyond which the protected apparatus would be endangered and at which the fuse is required to blow.

I thereby afford protection on starting against short circuits and on running against overloads that are greater than those the apparatus could withstand without injury, thus embodying both types of fuses in one, with the additional advantage of an ever-changing capacity to that of the motor and its surrounding atmospheric conditions. Thus a motor or other apparatus that will carry a certain overload without overheating in an ice box or cool climate will not even carry its rated overload in an engine room or in a torrid climate.

To further illustrate the difference in characteristics between my fuse and the ordinary fuses, it is to be observed that my fuse takes into account and is affected by the wattless current on alternating current circuits by reason of the fact that this wattless current is always dissipated in heat. The casing retains this heat by preventing rapid radiation and tends to decrease the temperature difference between the fusing point of the fusible element and the temperature attained by preheating it.

I claim:—

1. A protective device for the energizing windings of an electrical apparatus, comprising a fusible element, and conducting means adjacent thereto and in circuit therewith having a low heat dissipation and acting thermally thereon to alter the carrying capacity of said fusible element in accordance with changes in the thermal condition of the windings of the protected apparatus.

2. A protective device for the energizing winding of an electrical apparatus, comprising a fusible element, and a preheating conducting element in circuit therewith having a low heat dissipation and acting thermally thereon to modify the current-carrying capacity of the fusible element and thereby change the critical current value at which said element will fuse under the action of the current flowing therethrough.

3. A protective device for the energizing winding of an electrical apparatus, comprising a fusible element, and a preheating conducting element in circuit therewith and acting thermally thereon to alter the carrying capacity of said fusible element, means for retarding the thermal action of said preheating element, and means inclosing said elements acting to modify the thermal effect of said preheating element upon said fusible element.

4. A protective device for the current-carrying winding of an electrical apparatus, comprising a fusible element in circuit therewith and thermally acting means for automatically altering the carrying capacity of said fusible element, said thermally acting means being spaced from said fusible element a distance sufficient to maintain the integrity of the latter under all conditions of said means.

5. The combination with an electrical apparatus having a current-carrying winding, of protective means in circuit therewith having a fusible element and means acting thermally thereon in proportion to the thermal condition of said winding, but insufficient to fuse said element.

6. The combination with an electrical apparatus having a current-carrying winding, of protective means in circuit therewith having a fusible element and means acting thermally thereon to alter the carrying capacity of said fusible element and interposed media restraining the thermal action of said means below the fusing temperature of said element.

7. The combination with an electrical apparatus having a current-carrying winding, of protective means in circuit therewith having a fusible element and preheating means acting thereon to vary its current-carrying capacity, said means producing a temperature insufficient to fuse said element.

In testimony whereof I have hereunto set my hand this 2" day of August A. D. 1915, in the presence of the two subscribed witnesses.

S. N. BARUCH.

Witnesses:
 CARLOS P. GRIFFIN,
 A. H. KEPHART.